US011888520B2

(12) United States Patent
Soltani et al.

(10) Patent No.: US 11,888,520 B2
(45) Date of Patent: Jan. 30, 2024

(54) PHOTONIC INTEGRATED CIRCUIT (PIC) RADIO FREQUENCY SIGNAL CORRELATOR

(71) Applicant: Raytheon BBN Technologies, Corp., Cambridge, MA (US)

(72) Inventors: Moe D. Soltani, Belmont, MA (US); Ken Dinndorf, Belford, NH (US)

(73) Assignee: Raytheon BBN Technologies, Corp., Cambridge, MA (US)

( * ) Notice: Subject to any disclaimer, the term of this patent is extended or adjusted under 35 U.S.C. 154(b) by 0 days.

(21) Appl. No.: 17/843,992

(22) Filed: Jun. 18, 2022

(65) Prior Publication Data

US 2023/0412270 A1 Dec. 21, 2023

(51) Int. Cl.
*H04B 10/00* (2013.01)
*H04B 10/2563* (2013.01)
*G01S 13/44* (2006.01)

(52) U.S. Cl.
CPC ...... *H04B 10/2563* (2013.01); *G01S 13/4409* (2013.01); *H04B 2210/006* (2013.01)

(58) Field of Classification Search
CPC .......... H04B 10/2563; H04B 2210/006; G01S 13/4409
See application file for complete search history.

(56) References Cited

U.S. PATENT DOCUMENTS

| 6,404,535 B1 | 6/2002 | Leight | |
|---|---|---|---|
| 10,367,589 B2 * | 7/2019 | Gupta | H04B 10/616 |
| 11,075,786 B1 * | 7/2021 | Shattil | H04L 5/0007 |
| 2008/0152361 A1 * | 6/2008 | Chen | H04B 10/6164 398/205 |
| 2008/0152362 A1 * | 6/2008 | Koc | H04B 10/6162 398/205 |
| 2008/0316588 A1 * | 12/2008 | Enoch | H04B 10/00 359/326 |
| 2009/0034969 A1 | 2/2009 | Lewin et al. | |
| 2009/0263144 A1 * | 10/2009 | McKinney | H04B 10/2507 398/214 |

(Continued)

OTHER PUBLICATIONS

Esman et al., Comb-Assisted Cyclostationary Analysis of Wideband RF Signals, Journal of Lightwave Technology, Sep. 1, 2017, pp. 3712-3719, vol. 35, No. 17, IEEE.

(Continued)

*Primary Examiner* — Agustin Bello (57) ABSTRACT

A technology is described for a Photonic Integrated Circuit (PIC) radio frequency (RF) correlator. The PIC RF Correlator can comprise two optical waveguides to receive first and second optical signals that are modulated by first and second RF signals, respectively. Two 1 to M optical splitters can split the first and second RF modulated optical signals. Optical delay lines can delay the M split first RF modulated optical signals. M optical balanced couplers can receive and combine the M first delayed RF modulated optical signals with the M split second RF modulated optical signals. Balanced photodetectors can output a differential integration on the first and second combined RF modulated optical signals. A processor can add the outputs of the M optical balanced photodetectors to form a frequency domain correlated signal of the first and second RF signals.

20 Claims, 8 Drawing Sheets

(56) References Cited

U.S. PATENT DOCUMENTS

| | | | | |
|---|---|---|---|---|
| 2010/0329677 | A1* | 12/2010 | Kaneda | H04L 7/0278 398/152 |
| 2012/0213531 | A1* | 8/2012 | Nazarathy | G02F 7/00 398/202 |
| 2013/0236187 | A1* | 9/2013 | Middleton | H04B 10/00 398/116 |
| 2013/0309975 | A1* | 11/2013 | Kpodzo | H04B 17/336 455/63.1 |
| 2015/0257165 | A1* | 9/2015 | Gale | H04W 72/541 370/329 |
| 2017/0170903 | A1* | 6/2017 | Jain | H04B 10/6972 |
| 2017/0222721 | A1* | 8/2017 | Dailey | H04B 10/25752 |
| 2018/0097567 | A1* | 4/2018 | LeGrange | H04B 10/293 |
| 2019/0280774 | A1* | 9/2019 | Nazarathy | G02B 6/29302 |
| 2021/0018814 | A1* | 1/2021 | Gowda | H04J 14/08 |
| 2021/0021337 | A1* | 1/2021 | DeVore | H04B 10/0795 |

OTHER PUBLICATIONS

Roeloffsen et al., Silicon nitride microwave photonic circuits, Optics Express 22937, Sep. 23, 2013, 25 pages, vol. 21, No. 19, Optica, Washington, D.C.

Wiberg et al., Coherent Filterless Wideband Microwave/Millimeter-Wave Channelizer Based on Broadband Parametric Mixers, Journal of Lightwave Technology, Oct. 15, 2014, pp. 3609-3617, vol. 32, No. 20, IEEE.

Bourdarot et al., Multi-delay photonic correlator for wideband RF signal processing, Optica, Mar. 24, 2022, pp. 325-335, vol. 9, No. 4, Optica Publishing Group, Washington, DC.

Bourdarot et al., Multi-delay photonic correlator for wideband RF signal processing: supplement, Optica, Mar. 24, 2022, 10 pages, Optica Publishing Group, Washington, DC.

Bourdarot et al., Toward a large bandwidth photonic correlator for infrared heterodyne interferometry, Astronomy & Astrophysics, 2020, 7 pages, EDP Sciences, France.

Kibria et al., (IPC) A Photonic Correlation Scheme Using FWM With Phase Management to Achieve Optical Subtraction, IEEE Photonics Society, Dec. 2013, 10 pages, vol. 5, No. 6, Institute of Electrical and Electronics Engineers, Piscataway, New Jersey.

International Search Report for International Application No. PCT/US2023/025619 dated Oct. 11, 2023, 14 pages.

International Search Report for International Application No. PCT/US2023/0 25627 dated Oct. 11, 2023, 13 pages.

* cited by examiner

PHOTONIC INTEGRATED CIRCUIT (PIC) RADIO FREQUENCY SIGNAL CORRELATOR

BACKGROUND

A key element in receiving radio frequency signals is the ability to receive and compare multiple time delayed radio frequency signals. Signals that are delayed in time may be different signals from different sources, or may be signals from the same source that have been reflected off of different surfaces. Alternatively, the same signals may be transmitted by two or more locations and received at different times due to different path lengths.

The process of comparing multiple signals is referred to as signal correlation. Determining the correlation (sameness) of received signals provides a significant amount of helpful information. Two signals that arrive at different times can be combined together. The energy in the combined signals can be sufficient to raise the received signal power sufficiently above the noise floor that it can be immediately detected or integrated for latter detection. This can enable signals to be received at greater distances and lower transmitted powers than would otherwise be possible.

Further signal processing of the received signals can be used to determine additional information. For example, comparing the phase of two time-delayed signals can be useful in determining the source of the transmission of each of the received signals. This can be helpful in fields such as radar and electronic warfare.

Determining signal correlation for relatively narrowband signals, with bandwidths less than 1 gigahertz (GHz), is fairly simple using modern digital processors. However, computing the time-domain correlation for wideband signals (e.g. ≥5 GHz bandwidth) is computationally intensive, power hungry, and typically uses complicated hardware. An efficient alternative solution is to calculate the correlation in the frequency domain using frequency channelization. However, this task is not yet efficient for wideband signals (e.g. ≥5 GHz bandwidth) with existing radio frequency (RF) technology and can impose latency limitations in the reception of signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Calculating the correlation of two wideband radio signals with low latency in real-time is essential in many electronic warfare (EW) and direction-finding applications. Computing the time-domain correlation for wideband signals (e.g. ≥5 GHz), expressed as:

$$\chi(\tau) = \int_{-\infty}^{\infty} s_1^*(t-\tau) \cdot s_2(t) dt \quad \text{(Eq. 1)}$$

is computationally intensive, power hungry, and typically uses complicated hardware. An efficient alternative solution is to calculate the correlation in the frequency domain. Once a signal has been converted to the frequency domain, the signal can be split into multiple different pieces using frequency channelization. The multiple pieces of the signal can then be calculated in parallel. However, this task is not yet efficient for wideband signals with existing RF technology and can impose latency limitations.

One means of performing correlation measurements of radio frequency signals is through the use of radio frequency cables, analog radio frequency components, and digital signal processors. When using typical radio frequency communications equipment to perform a correlation calculation, such as separate coaxial cables to communicate the multiple signal paths, each signal path length is carefully calculated and measured. Small changes in one or more path lengths can change the phase of the signal and result in inaccurate results in the correlation calculation. Expensive connectors and complex calibrations are performed to minimize potential errors. Even cable temperatures can cause changes in length that can affect the correlation calculation. Specialized heaters can be used to accurately maintain the length of each cable.

The use of multiple RF cables is not only complicated and imposes latency, it also requires sufficiently precise registration and calibration of the different channels. This imposes a limit on the obtainable precision and noise of these architectures. As technology scales, an RF channelized architecture will inevitably have too high a noise and precision floor to detect some signals of interest. Accordingly, performing correlation measurements of broadband RF signals using RF cables and processing can be expensive, bulky, power consuming, and difficult to maintain a proper calibration.

An alternative to using RF components and cables is to use optical components and optical paths. The low loss and wide bandwidth capability of photonics technology allows implementation of correlator architectures. Typical optical architectures involve using photonic filter channelizers followed by digitization and correlation in the electronic domain. Another optical architecture involves the use of frequency combs. The frequency comb approach uses on-chip comb sources with high stability and uniformity of comb lines. Other approaches have used custom fabrications of a bank of low-loss, low-crosstalk, narrow-passband photonic integrated circuit filters that are made of many resonators. The resonator architecture also used sophisticated calibration and control techniques.

In accordance with one embodiment of the present invention, a novel photonic integrated circuit (PIC) based architecture for the efficient computation of the frequency-domain correlation in the optical domain is disclosed. The PIC based architecture resolves many of the challenges of creating a near-real time RF correlator for broadband signals (i.e. >5 GHz bandwidth). The PIC can be formed of silicon or other materials which can support optical waveguides. With modern advanced silicon chip manufacturing techniques, a silicon PIC can be formed with very precise physical constraints, with the lengths of photonic waveguides and placement of components accurate to within ones of nanometers to tens of nanometers. The small size and accurate manufacturing of an RF PIC system enables the components to be easily temperature controlled within a relatively small enclosure (i.e. 4 to 100 square inches) with a relatively low amount of power (i.e. 1 to 50 watts).

An RF signal can be modulated onto an optical signal. The optical signal can then be efficiently divided to enable parallel processing of the signal. The PIC architecture allows the optical signal to be precisely divided with substantially equal power output of multiple signals. With accurate control of the signal power, signal routing, and temperature, the RF PIC system can minimize the need for multiple repeated calibrations that are often used in RF correlation systems. Additional advantages will be noted as embodiments of the system are disclosed.

Figure 1:
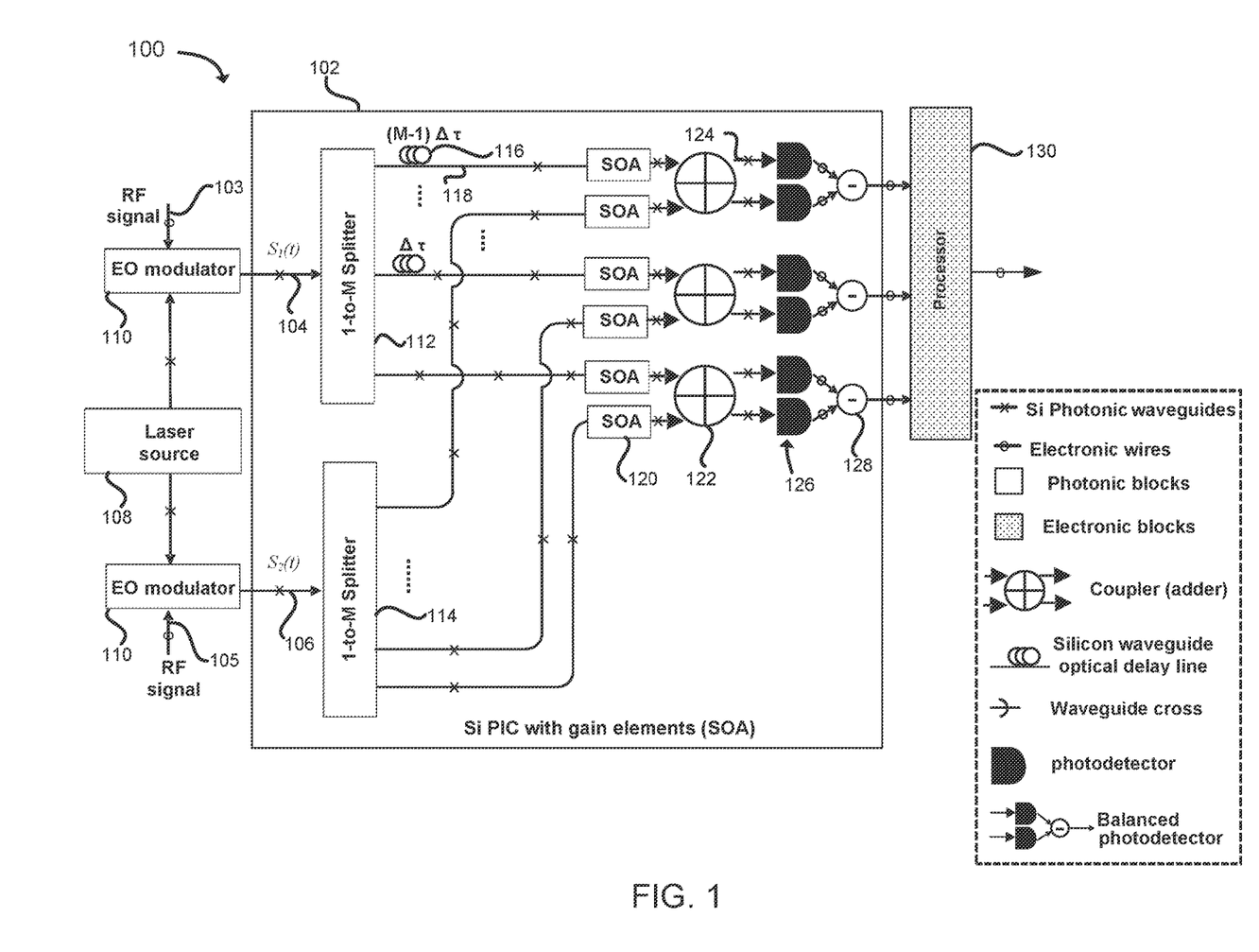
FIG. 1 illustrates a Photonic Integrated Circuit (PIC) Radio Frequency (RF) Correlator System in accordance with an example.
Figure 2:
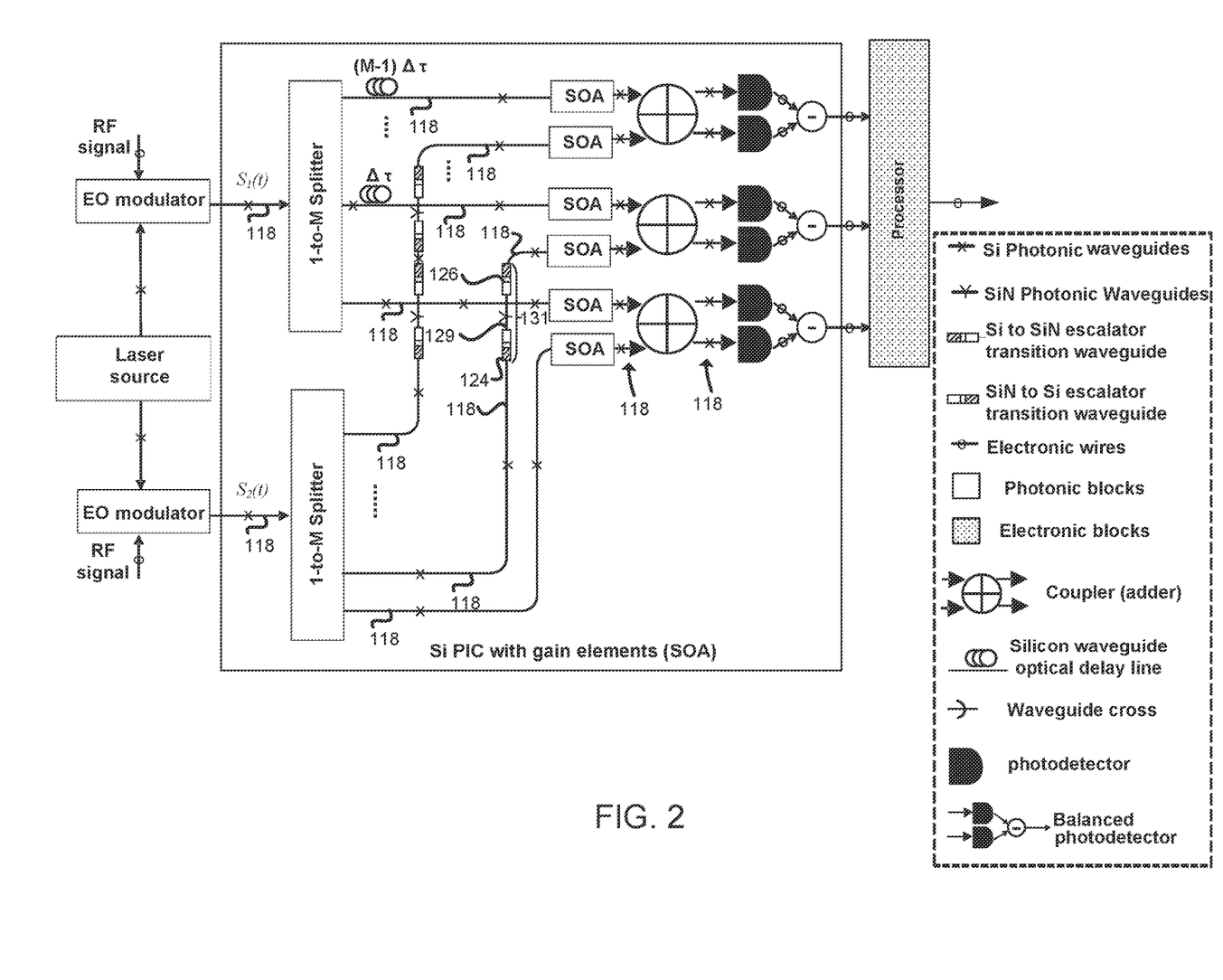
FIG. 2 illustrates a PIC RF Correlator System with waveguide escalators configured for waveguide crosses in accordance with an example.
Figure 3:
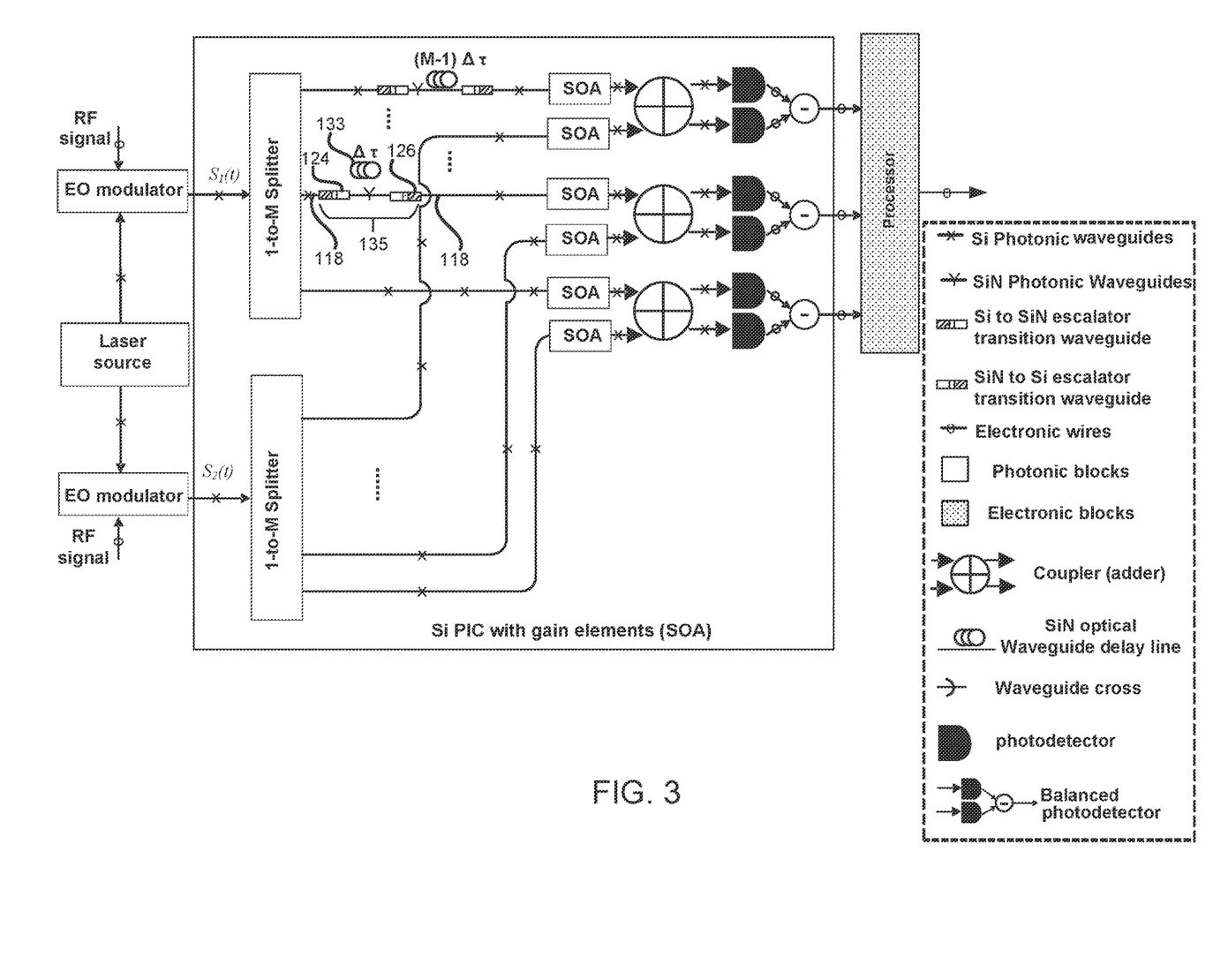
FIG. 3 illustrates a PIC RF Correlator System with waveguide escalators configured for optical delay lines in accordance with an example.

FIG. 1 provides one example architecture of a PIC RF correlator system 100. The system comprises a photonic integrated circuit 102 that includes a first optical waveguide 104 that is configured to receive a laser light signal that has been modulated with a first RF signal 103 to form the first RF modulated optical signal $S_1(t)$ where t is time. A second optical waveguide 106 is similarly configured to receive a laser light signal of the laser light source modulated with a second RF signal 105 to form the second RF modulated optical signal $S_2(t)$.

The use of silicon to form the PIC has several advantages, including the cost of manufacturing and the advanced processes for controlling dimensions in silicon substrates down to the single nanometer. However, the PIC can also be formed of other semiconductors such as lithium niobate, silica on silicon, silicon on insulator, polymers and semiconductor materials which are used to make semiconductor lasers such as gallium arsenide (GaAs) and indium phosphide (InP). Elements of the PIC such as splitters, amplifiers, waveguides, delay lines, and so forth can be separate devices that are attached to the PIC, or devices that are implemented in the PIC. This will be discussed more fully in the proceeding paragraphs.

In the example of FIG. 1, the laser source 108 is shown as being located external to the PIC 102. The laser source 108 can be a continuous wave (CW) laser source. An example wavelength that can be used is 1310 nanometers (nm) or 1550 nm. However, any wavelength that is compatible with the PIC can be used. In addition, the laser can be heterogeneously integrated (i.e. attached) on the PIC. The laser can also be implemented within the PIC, with a portion of the PIC itself configured to produce the laser light.

Electro-optic (EO) modulators 110 can be used to modulate the RF signals 103, 105 on the output of the laser source 108 to form the first RF modulated optical signal $S_1(t)$ and a second RF modulated optical signal $S_2(t)$, respectively. As with the laser source 108, the EO modulators 110 can be heterogeneously integrated on the PIC (i.e. attached to the PIC), implemented within the PIC itself, or located external to the PIC and optically coupled to the PIC via one or more of an optical fiber, an optical waveguide, or a free-space coupling to the first and second optical waveguides 104, 106, respectively. The RF signals 103 and 105 can be modulated on the output of the laser source 108 without digitization. Accordingly, no information loss in the RF signals will occur due to quantization.

The first and second RF modulated optical signals $S_1(t)$ and $S_2(t)$ can be guided by the first and second optical waveguides 104, 106 to first and second optical splitters 112, 114, respectively. The optical splitters can be referred to as 1 to M optical splitters 104, 106, where M is a positive integer. As the size of M is increased, the accuracy of the correlation measurement also increases. M can be 2, 4, 8, 16, 32, 64, 128, 256 and so on. It is noted that M does not have to be an even number.

The 1 to M optical splitters 104, 106 can be comprised of one or more of a cascade of multimode interference splitters, a binary-tree cascade of 1-to-2 splitters, or 1-to-N splitters, where N is an integer that is less than M. The optical splitters 104, 106 can be comprised of a mixed combination of these architectures. The 1 to M optical splitters 104, 106 can have 1 input and M outputs, and configured to divide the first and second RF modulated optical signals $S_1(t)$ and $S_2(t)$ into M first RF modulated optical signals $S1'(t)$ and M second RF modulated signals $S2'(t)$. Each of the M first and second RF modulated optical signals $S1'(t)$ and $S2'(t)$ can have substantially equal power levels. Ideally, $S_1'(t)=S_1(t)/(M)^{0.5}$, such that the signal power, which is the square of the amplitude, is $|S_1'|^2(t)=|S_1|^2(t)/M$. Similarly, $S_2'(t)=S_2(t)/(M)^{0.5}$, such that the signal power, which is the square of the amplitude, is $|S_2'|^2(t)=|S_2|^2(t)/M$.

Power imbalances can decrease signal fidelity. Power imbalances decrease signal fidelity, but most power-imbalance signal distortion can be corrected with post-digitization signal processing if the magnitude of the imbalance is known to sufficient precision. The higher the signal fidelity requirements, the more constrained the resulting power splitting requirements become; these requirements can be achieved either through calibration of the power splitting, or through subsequent digital processing. The relatively high stability of photonic waveguide splitters improves calibration stability relative to other approaches. In general, the error in a correlated signal ($\sigma_{Sig}$) will be proportional to the mean power error per channel divided by the square root of the number of the channels, expressed as $$\sigma_{Sig} = A < \sigma_{Pow} > \frac{1}{\sqrt{M}} = A \frac{\sum_{i=1}^{M} \sigma_{Pow}^{i}}{M} \frac{1}{\sqrt{M}},$$

where M is the number of channels, $\sigma_{pow}$ is the power variance per channel i, and A is a configuration-depending proportionality constant. Based on the desired application, the system can be designed with a predetermined tolerance to produce the necessary precision by controlling the precision of the power balance. This relationship applies for either balanced (50/50) splitters or unbalanced splitting ratios (splitting ratios are not equal to 50/50) if advantageous for the application or system.

Depending on the signal fidelity requirements of a system in which the PIC RF correlator system 100 is used, the power balance can be achieved through calibration and power splitting. In addition, post-digitization signal processing can be used to compensate for power imbalances that may exist between the M S1'(t) signals or the M S2'(t) signals. The relatively-high stability of photonic waveguide splitters improves the calibration stability of the PIC RF correlator system 100 relative to other approaches, such as RF systems. In one example, depending on system requirements, the power imbalance between any one of the M S1'(t) signals or the MS2'(t) signals can be between 0.001% and 10%. In some low end systems, an inexpensive PIC RF correlator system 100 with relatively low calibration levels with a power imbalance of greater than 10% may still be useful with additional post-digitization signal processing.

The M outputs of the first 1 to M optical splitter 112 can be coupled to optical waveguides 118. These optical waveguides can be coupled to optical delay lines 116, also referred to as discrete delay taps, to provide desired delays to the split signals S1'(t). In one embodiment, the optical delay lines 116 can be silicon waveguides implemented in the PIC. The silicon waveguides can be configured to be substantially low loss and add limited distortion to the M S1'(t) signals. The delay lines 116 can also be comprised of a homogenous optical waveguide material comprising indium phosphide, gallium arsenide, or other optical waveguide materials. The length of the optical delay lines 116 can be discrete to provide a different delay for each of the M signals, from zero delay to a delay of (M−1) Δτ, where 1/Δτ is more than twice a bandwidth of the first RF signal 113. The bandwidth of the first or second RF signal can be, for example, from 1 GHz to 250 GHz.

In one example, the delay lines can be spaced equally between 0×Δτ (i.e. zero delay) to (M−1) Δτ respectively to provide M different substantially uniform time delayed first RF modulated optical signals S1'(t), S₁'(t−Δτ), . . . S₁'(t−(M−1) Δτ). To provide zero delay, one or more of the optical delay lines 116 may not include a delay line. In another embodiment, the delay lines may not be equally spaced to provide non-uniform delays in the M S'1(t) signals. In this configuration, the set of delays can be selected to resolve ambiguities and/or antialiasing in the resultant correlated signal. The signal bandwidth in the correlated signal will be substantially greater than can be spanned with M signals of uniform temporal spacing. Various mathematical techniques, such as sparse sampling or prime number techniques, can take advantage of delays of non-equal length to provide desired information in the correlated signal.

The M second RF modulated optical signals $S_2'(t)$ are not delayed. Each of the M second RF modulated optical signals $S_2'(t)$ are directed from the second optical splitter using a photonic waveguide 118. Each waveguide 118 for the M different delayed first RF modulated optical signals S1'(t), $S_1'(t-\Delta\tau)$, . . . $S_1'(t-(M-1)\Delta\tau)$ and the second RF modulated optical signals $S_2'(t)$ can be directed to a separate amplifier to amplify the optical signals. In one example, as illustrated in FIG. 1, a semiconductor optical amplifier (SOA) can be heterogeneously integrated with or directly implemented within the PIC 102. An SOA can be coupled to each of the M outputs of the first 1-to-M optical splitter 112 and the M outputs of the second 1-to-M optical to provide a selected optical gain to the M different delayed first RF modulated optical signals S1'(t), $S_1'(t-\Delta\tau)$, . . . $S_1'(t-(M-1)\Delta\tau)$ and the M second RF modulated optical signals $S_2'(t)$.

The various optical waveguides 118 on the PIC 102 may need to cross other waveguides to direct each signal to the desired location. In one embodiment, waveguide crossing elements can be used to enable the photonic waveguides 118 from the M outputs of the second 1 to M optical splitter 114 to cross selected photonic waveguides coupled to the first 1 to M optical splitter 112.

In another embodiment, waveguide escalator elements 131 can be used at a waveguide cross, as illustrated in FIGS. 2, 4, 6 and 7. The waveguide escalator elements 131 can enable photonic waveguides 118 from the M outputs of the second 1 to M optical splitter 114 to cross selected photonic waveguides 118 coupled to the M outputs of the first 1 to M optical splitter 112. Alternatively, the waveguide escalator elements 131 can enable photonic waveguides 118 from the M outputs of the first 1 to M optical splitter 112 to cross selected photonic waveguides 118 coupled to the M outputs of the second 1 to M optical splitter 114.

In one example, as shown in FIGS. 2, 4, 6 and 7, the escalator elements 131 can be comprised of a waveguide comprising a first section of silicon waveguide 118 followed by a transition waveguide region of increasing doped silicon nitride 124, followed by a silicon nitride waveguide 129, followed by a decreasingly doped transition waveguide region of decreasingly doped silicon nitride 126, followed by a silicon waveguide 118. The transition waveguide region increases/decreases in height such that the silicon nitride waveguide 129 can be positioned at some height above the crossing waveguide below. While silicon and silicon nitride are used in these examples, they are not intended to be limiting.

In another example, as shown in FIGS. 3, 4, 6 and 7, a waveguide delay line escalator element 135 can be configured to form a delay line. The delay line waveguide escalator element 135 can be comprised of a waveguide comprising a first section of silicon waveguide 118 followed by a transition waveguide region of increasing doped silicon nitride 124, followed by a silicon nitride optical waveguide delay line 133, followed by a decreasingly doped transition waveguide region of decreasingly doped silicon nitride 126, followed by a silicon waveguide 118.

In another example, a waveguide escalator, such as 131 or 135, as shown in FIGS. 2, 3, 4 6, and 7, can be formed of a first waveguide section formed of a first single-chemistry material, coupled to a second waveguide section with a transition waveguide region that is increasingly doped with a second single-chemistry material, coupled to a third waveguide section or delay line that is formed of the second single-chemistry material, coupled to a fourth waveguide section with a decreasingly doped transition waveguide region of decreasingly doped second single-chemistry material, coupled to a fifth waveguide section that is formed of the first single-chemistry material. The second through fourth waveguide sections form the escalator. The first and fifth sections can be portions of the waveguide on either side of the waveguide cross that the escalator is attached to. The escalator elements 131 can substantially reduce optical signal loss and interference at the waveguide crossing between the $S_1'(t)$ and $S_2'(t)$ signals. The waveguide delay line escalator element 135 can reduce signal loss in the delay line.

The $S_1'(t)$ and $S_2'(t)$ signals can be correlated in the frequency domain. Frequency domain correlation can be described by the expression:

$$\tilde{\chi}(f) = \int_{-\infty}^{\infty} \chi(\tau)\exp(-j2\pi f\tau)d\tau \qquad \text{(Eq. 2)}$$

To compute the frequency-domain correlation one can break the original expression, (Eq. 2), into discrete summations, where the continuous integral is broken into sigma summations, as expressed in Eq. 3:

$$\tilde{\chi}(f) = \sum_{m=0}^{M-1} \chi(m\Delta\tau)\exp(-j2\pi f\Delta\tau), \qquad \text{(Eq. 3)}$$

where $\chi(m\Delta\tau)$ is equivalent to:

$$\chi(m\Delta\tau) = \int_{-\infty}^{\infty} s_1^*(t-m\Delta\tau)\cdot s_2(t)dt. \qquad \text{(Eq. 4)}$$

In Eq. 3, the intense computational task is to calculate $\chi(m\Delta\tau)$ for different m values, and then insert them in the summation in Eq. 3. The computation of Eq. 4 for broad bandwidths, such as bandwidths ≥5 GHz is computationally intensive.

However, $\chi(m\Delta\tau)$ (i.e. Eq. 4) can be calculated fairly simply in the optical domain using the optical delay lines with delay MAT to provide delayed signals $S_1'(t-m\Delta\tau)$ and combine each of the delayed signals with $s_2(t)$ before sending the combined signals to a balanced photodetector (which is inherently a correlation integrator) to calculate $$\chi(m\Delta\tau) = \int_{-\infty}^{\infty} s_1^*(t-m\Delta\tau)\cdot s_2(t)dt.$$

Accordingly, the PIC 102, as illustrated in the example of FIG. 1, can further comprise M optical balanced couplers 122 of index m, where m=0 to M−1. The balanced coupler can also be a balanced interferometer, or a balanced multimode interference filter. Each optical balanced coupler 122 can have two optical inputs and two optical outputs. In one example, each optical coupler can input the $m^{th}$ different delayed first RF modulated optical signal $S_1'(t-m\Delta\tau)$ and one of the M second RF modulated signals $S_2'(t)$ to output m first coupled RF modulated optical signals and m second coupled RF modulated optical signals. The outputs of the balanced optical coupler 122 are $s_1(t-m\Delta\tau)+s_2(t)$ for one output and $s_1(t-m\Delta\tau)-s_2(t)$ for the other output. The mth first coupled RF modulated optical signal comprises an optical output $C_{1m}(t)$ that is equal to $[S_1'(t-m\Delta\tau)+jS_2'(t)]$ $2^{0.5}$, where j is an imaginary number. The mth second coupled RF modulated optical signal comprises an optical output $C_{2m}(t)$ that is equal to $[jS_1'(t-m\Delta\tau)+S_2'(t)]/2^{0.5}$.

Each optical output is communicated through a waveguide 124, such as a silicon waveguide, and directed to a balanced photodetector 126. Each balanced photodetector can be comprised of two photodetectors that effectively integrate the outputs of the balanced coupler and determine the difference. Mathematically, this can be described as:

$$\text{detector1 output}=\int |s_1(t-m\Delta\tau)+s_2(t)|^2 dt, \qquad \text{(Eq. 5)}$$

which is equivalent to:

$$\int |s_1(t-m\Delta\tau)|^2 dt + \int |s_2(t)|^2 dt + \int s_1^*(t-m\Delta\tau)\cdot s_2(t)dt + c.c \qquad \text{(Eq. 6)}$$

$$\text{detector2 output}=\int |s_1(t-m\Delta\tau)-s_2(t)|^2 dt, \qquad \text{(Eq. 7)}$$

that is equivalent to:

$$\int |s_1(t-m\Delta\tau)|^2 dt + \int |s_2(t)|^2 dt - \int s_1^*(t-m\Delta\tau)\cdot s_2(t)dt - c.c \qquad \text{(Eq. 8)},$$

where c.c is the complex conjugate. The detector1 output and detector2 output of the balanced photodetector 126 can be sent to a differential 128. The differential 128 output of the optical balanced couplers 126 can be expressed as:

$$\text{differential output}=2(\int s_1^*(t-m\Delta\tau)\cdot s_2(t)dt + c.c) \qquad \text{(Eq. 9)}.$$

The differential output of each of the balanced photodetectors 126, as expressed in Eq. 9, is a signal that is proportional to a correlation integrated weight coefficient. The output of the M balanced photodetectors 126 can then be sent as an electrical signal to a processor 130. The processor can be a digital signal processor (DSP) configured to receive baseband signals. The processor can be a generic processor, or a specialized processor such as a field programmable gate array (FPGA) or application specific integrated circuit (ASIC). The processor can also include an analog to digital (A2D) converter. The processor can receive and sum the M electrical signals proportional to a correlation integrated weight coefficient according to the summation $\Sigma_{m=0}^{M-1}\chi(m\Delta\tau)\exp(i2\pi m\Delta\tau f)$, to output a frequency domain correlated signal 140 of the first RF signal and the second RF signal, where i is an imaginary number, f is the frequency of the frequency domain correlated signal, and $\chi(m\Delta\tau)= \int_{-\infty}^{\infty} S_1^*(t-m\Delta\tau)\cdot S_2(t)dt$, and $S_1^*$ is the complex conjugate of S1.

The PIC 102 in FIG. 1 is configured to form a near-real-time RF correlator engine. Two RF signals with bandwidths greater than 5 Ghz, 10 Ghz, or even greater than 50 GHz can be correlated in near real-time, with the output of the processor 130 providing a frequency domain correlated signal 140 of the first RF signal and the second RF signal. The PIC 102 can include a number of different embodiments.

For example, in one embodiment, the PIC RF correlator system 100 can be configured to provide a high accuracy output signal from the processor 130 in near-real-time. In order to obtain the high accuracy output, high accuracy components can be selected for the PIC 102 and inputs to the PIC 102. For example, the PIC 102 can be designed and built with high tolerances. The PIC can include low loss delay lines 116, with precision control of the delay. Escalator elements 131 can also be used at waveguide crosses and/or in optical delay lines. An off-PIC (or heterogeneously integrated) high linearity EO modulator 110 (such as lithium-niobate modulators) can be used to achieve significantly better spur-free-dynamic range (and therefore better noise and dynamic range) than is possible using a EO modulators implemented in the PIC 102. An off-PIC EO modulator can be coupled to the first optical waveguide 104 and another off-PIC EO modulator 110 can be coupled to the second optical waveguide 106. An external laser source 108 can be optically coupled to the off-PIC EO modulators, as shown in FIG. 1. The PIC system 100 can be maintained in a temperature controlled environment.

Figure 4:
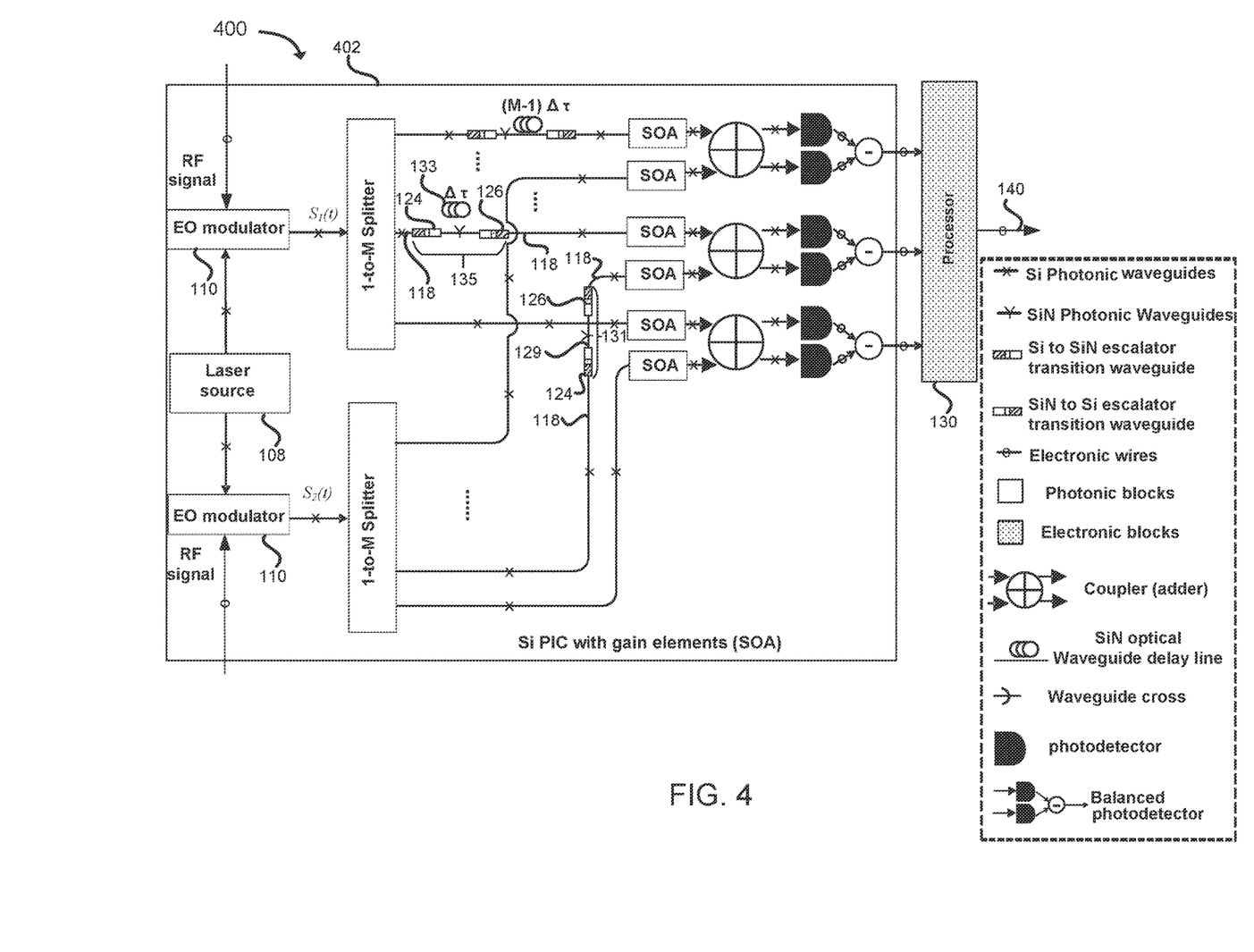
FIG. 4 illustrates a compact integrated PIC system in accordance with an example.

A PIC RF correlator system 100 that is configured to provide a high accuracy output may be too expensive and/or too bulky for some embodiments. In another embodiment, as illustrated in the example of FIG. 4, a compact integrated PIC system 400 can comprise a compact integrated PIC 402 that can include a laser source 108 and EO modulators 110 that can be coupled to or implemented in the compact integrated PIC 402. The PIC can also include mixed RF and optical signals with RF carried on the PIC via an RF transmission line, such as a RF strip line carried on the PIC 402. The compact integrated PIC 402 may also be fabricated using a less expensive fabrication processes relative to PIC designed for high accuracy. The compact integrated PIC 402 can also be maintained in a temperature controlled environment. Even with a lower quality laser source 108, lower quality EO modulator 110, and photonic waveguides 118 with greater loss and greater differences in path length relative to the high accuracy PIC system 102, the processor 130 coupled to the compact integrated PIC 402 can still be configured to output a frequency domain correlated signal 140 that can be useful in systems including, but not limited to electronic warfare, direction finding systems, wideband signal communication, signal processing systems that use a wideband, low size, weight, and power correlator, and 5G communication systems.

Figure 5A:
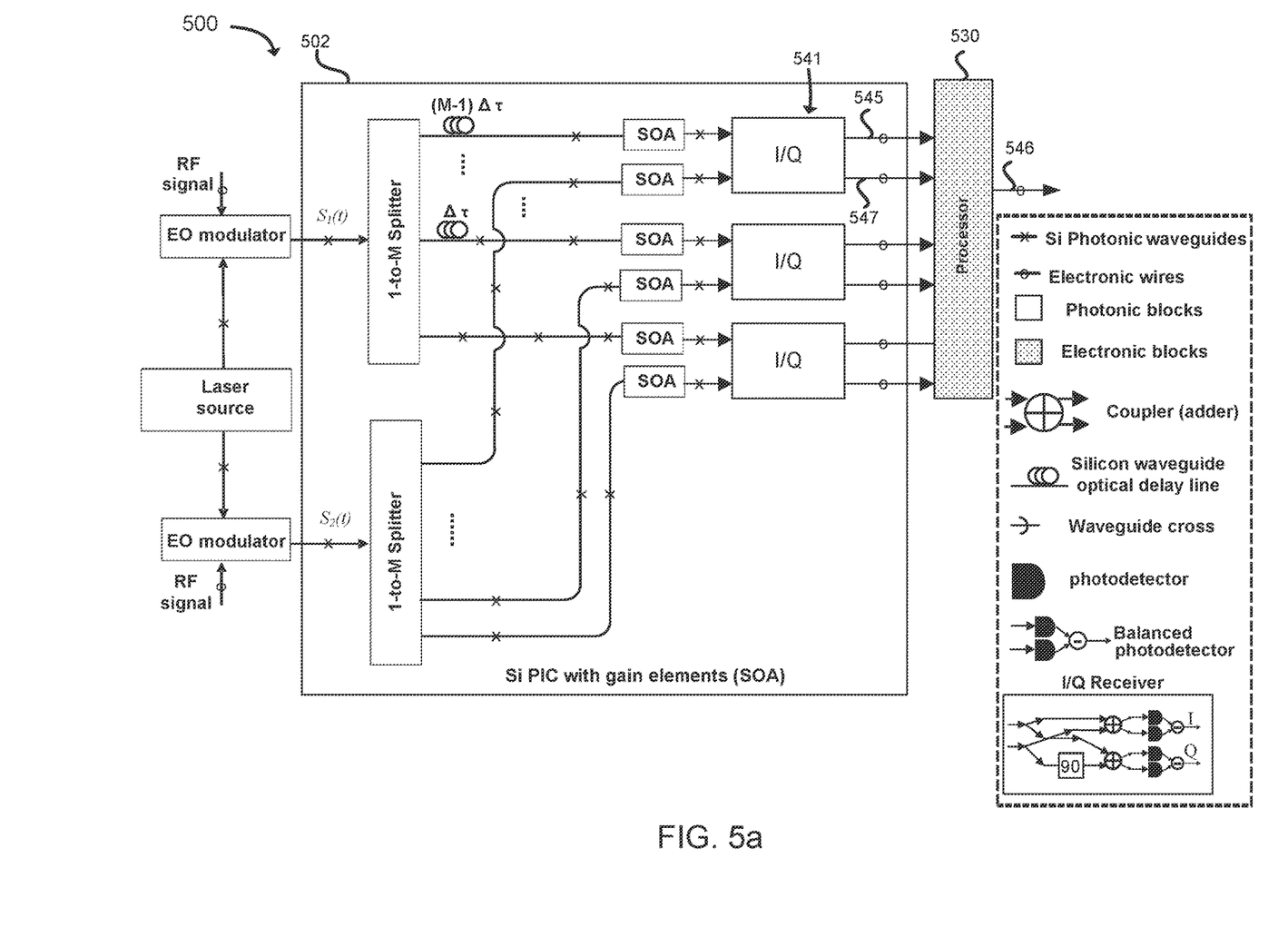
FIG. 5a illustrates a PIC RF correlator system with a PIC that includes an In-phase (I) and Quadrature-phase (Q) (I/Q) receiver in accordance with an example.

FIG. 5 provides an example embodiment of a PIC RF correlator system 500 with a PIC 502 that includes an In-phase (I) and Quadrature-phase (Q) (I/Q) photo receiver 541 of index M. Each I/Q photo receiver 541 is configured to receive two optical inputs. In one example, an Mth I/Q photo receiver 541 can receive the $m^{th}$ different delayed first RF modulated optical signal $S_1'(t-m\Delta\tau)$ and one of the M second RF modulated signals $S_2'(t)$. The I/O photo receiver 541, as shown in FIG. 5, is configured to split each of these signals and send them each to two separate optical balanced couplers in the Mth I/O photo receiver 541.

A first optical balanced coupler will operate the same as the optical balanced coupler 122 described with respect to the example in FIG. 1, and provide an in-phase (I) output from the differential component of the balanced photodetectors that is a real component, as in FIG. 1.

Mathematically, this can be described as before:

$$\text{photodetector 1 output} = \frac{1}{2}\int |s_1(t-m\Delta\tau) + s_2(t)|^2 dt, \quad \text{(Eq. 10)}$$

which is equivalent to:

$$\frac{1}{4}\left(\int |s_1(t-m\Delta\tau)|^2 dt + \int |s_2(t)|^2 dt + \int s_1^*(t-m\Delta\tau)\cdot s_2(t)dt + c\cdot c\right) \quad \text{(Eq. 11)}$$

$$\text{photodetector 2 output} = \frac{1}{2}\int |s_1(t-m\Delta\tau) - s_2(t)|^2 dt, \quad \text{(Eq. 12)}$$

that is equivalent to:

$$\frac{1}{4}\left(\int |s_1(t-m\Delta\tau)|^2 dt + \int |s_2(t)|^2 dt - \int s_1^*(t-m\Delta\tau)\cdot s_2(t)dt - c\cdot c\right). \quad \text{(Eq. 13)}$$

where c.c is the complex conjugate. The photodetector1 output and photodetector2 output of the balanced photodetector can be sent to a differential. The differential output of the optical balanced couplers can be expressed as:

$$\text{differential output} = \left(\int s_1^*(t-m\Delta\tau)\cdot s_2(t)dt + c\cdot c\right) = \quad \text{(Eq. 14)}$$

$$\text{Real}\left(\int s_1^*(t-m\Delta\tau)\cdot s_2(t)dt\right) = \text{real}(\chi(m\Delta\tau)).$$

The differential output of the balanced photodetectors of the first balanced couplers in the Mth I/O photo receiver 541, as expressed in Eq. 14, is a signal that is proportional to a magnitude of a correlation integrated weight coefficient, referred to herein as a magnitude output 545. It represents the real portion of the correlation integrated weight coefficient. The magnitude output 545 from each of the M I/O photo receivers 541 can then be sent as an electrical signal to the processor 530. The processor 530 can be a digital signal processor (DSP) configured to receive baseband signals. The processor 530 can be a generic processor, or a specialized processor such as a field programmable gate array (FPGA) or application specific integrated circuit (ASIC). The processor 530 can also include an analog to digital (A2D) converter. The processor 530 can receive and sum the M magnitude outputs 545 according to the summation $$\sum_{m=0}^{M-1} \chi(m\Delta\tau)\exp(i2\pi m\Delta\tau f),$$

to output a magnitude of a frequency domain correlated signal 540 of the first RF signal and the second RF signal, where i is an imaginary number, f is the frequency of the frequency domain correlated signal, and $$\chi(m\Delta\tau) = \int_{-\infty}^{\infty} S_1^*(t-m\Delta\tau)\cdot S_2(t)dt, \text{ and } S_1^*$$

is the complex conjugate of S1.

A second optical balanced coupler in the Mth I/O photo receiver 541 will receive the same $m^{th}$ different delayed first RF modulated optical signal $S_1'(t-m\Delta\tau)$ as the first optical balanced coupler in the Mth I/O photo receiver 541. However, the second RF modulated signal $S2'(t)$ has a phase change of 90 degrees. Mathematically, this can be described as:

$$\text{photodetector 1 output} = \frac{1}{2}\int |s_1(t-m\Delta\tau) + js_2(t)|^2 dt, \quad \text{(Eq. 15)}$$

which is equivalent to:

$$\frac{1}{4}\left(\int |s_1(t-m\Delta\tau)|^2 dt + \right. \quad \text{(Eq. 16)}$$

$$\left. \int |s_2(t)|^2 dt + j\int s_1^*(t-m\Delta\tau)\cdot s_2(t)dt - j\int s_1(t-m\Delta\tau)\cdot s_2^*(t)dt\right)$$

$$\text{photodetector 2 output} = \frac{1}{2}\int |s_1(t-m\Delta\tau) - js_2(t)|^2 dt, \quad \text{(Eq. 17)}$$

that is equivalent to:

$$\frac{1}{4}\left(\int |s_1(t-m\Delta\tau)|^2 dt + \int |s_2(t)|^2 dt - \right. \quad \text{(Eq. 18)}$$

$$\left. j\int s_1^*(t-m\Delta\tau)\cdot s_2(t)dt + j\int s_1(t-m\Delta\tau)\cdot s_2^*(t)dt\right)$$

The photodetector1 output and photodetector2 output of the balanced photodetector can be sent to a differential. The differential output of the optical balanced couplers can be expressed as:

differential output = (Eq. 19)

$$j\left(\int s_1^*(t-m\Delta\tau)\cdot s_2(t)dt - \int s_1(t-m\Delta\tau)\cdot s_2^*(t)dt\right) =$$

$$imag\left(\int s_1^*(t-m\Delta\tau)\cdot s_2(t)dt\right) = imag(\chi(m\Delta\tau))$$

Figure 5B:
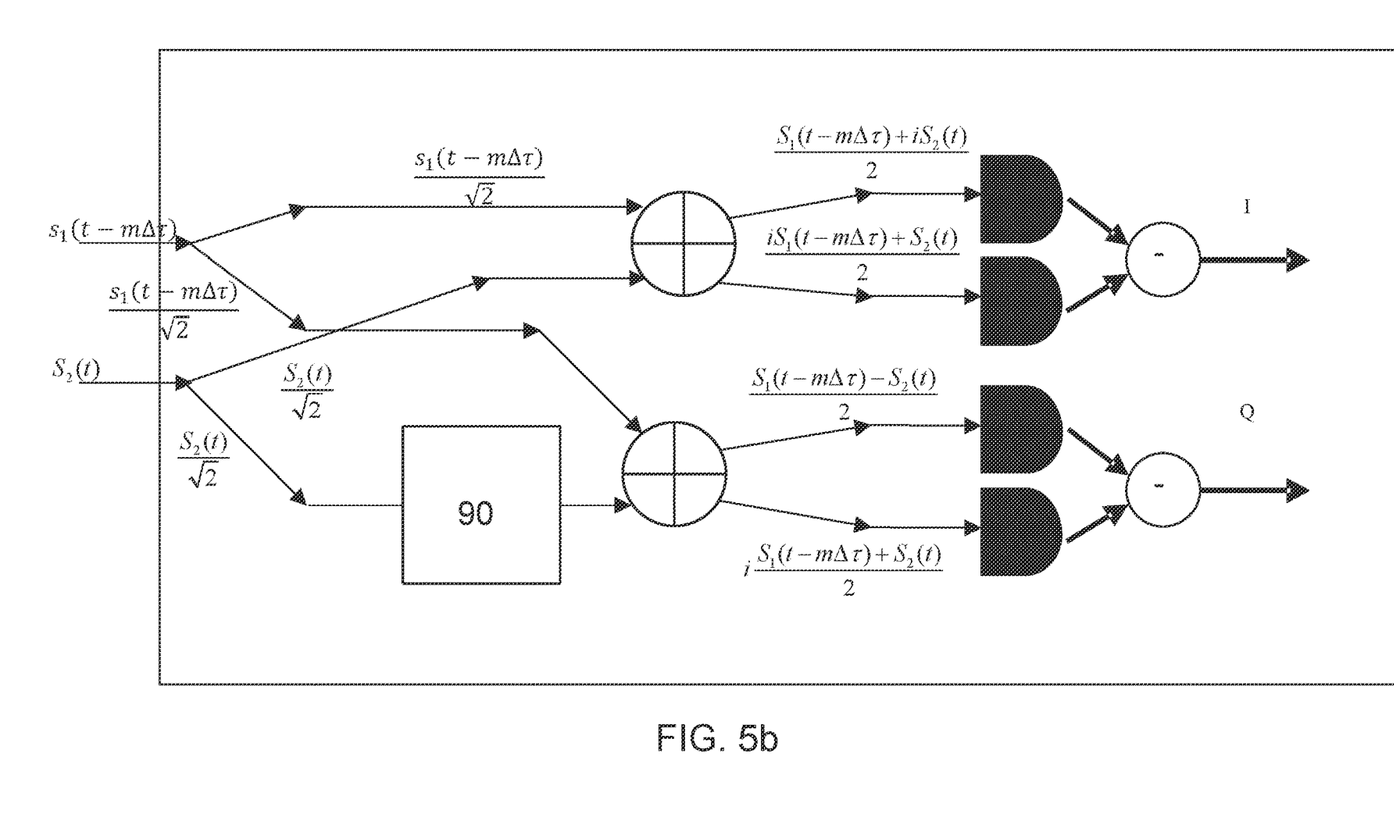
FIG. 5b illustrates an embodiment of the I/Q receiver of FIG. 5a in accordance with an example.

The differential output of the balanced photodetectors of the second balanced coupler in the Mth I/O photo receiver 541, as expressed in Eq. 19, is a signal that is proportional to an imaginary of a correlation integrated weight coefficient, referred to herein as an imaginary output 547. The imaginary output 547 represents the imaginary component of the correlation integrated weight coefficient. The imaginary output 547 from each of the M I/O photo receivers 541 can then be sent as an electrical signal to the processor 530. The processor 530 can receive and sum the M real outputs 545 and imaginary outputs 547 according to the summation $$\sum_{m=0}^{M-1}(\text{Real}(\chi(m\Delta\tau)) + \text{Imag}(\chi(m\Delta\tau)))\exp(i2\pi m\Delta\tau f),$$

to output a complete frequency domain correlated signal containing both the real and the imaginary information of signal 546 of the first RF signal $S_1(t)$ and the second RF signal $S_2(t)$, where Imag is an imaginary number, f is the frequency of the frequency domain correlated signal, and $$\chi(m\Delta\tau) = \int_{-\infty}^{\infty} S_1^*(t-m\Delta\tau)\cdot S_2(t)dt, \text{ and } S_1^*$$

is the complex conjugate of S1. The processor 530 can output 540 both the real and imaginary portions of the frequency domain correlated signal. FIG. 5b provides a more detailed illustration of the I/O photo receiver 541, with the $m^{th}$ different delayed first RF modulated optical signal $S_1'(t-m\Delta\tau)$ and one of the m second RF modulated signals $S_2'(t)$ as an input. The $S_1'(t-m\Delta\tau)$ signal is split in two substantially equal parts, to form an input signal $$\frac{S_1(t-m\Delta\tau)}{\sqrt{2}}$$

to the corresponding in-phase (I) and quadrature phase (Q) optical balanced in-phase couplers. Similarly, the signal $S_2'(t)$ is split into two substantially equal portions of $$\frac{S_2(t)}{\sqrt{2}},$$

and input into the second in-phase and quadrature phase inputs of the optical balanced in-phase coupler. The input of the quadrature phase is shifted by 90 degrees, as shown in FIG. 5b.

In one example, the first output of the optical balanced in-phase coupler of the I/O photo receiver 541 of the M I/O photo receivers comprises an optical balanced in-phase coupler of index m having a first input, a second input, a first output and a second output, where m=0 to M−1, the optical balanced in-phase coupler configured to receive and combine the $m^{th}$ different delayed first RF modulated optical signal $S_1'(t-m\Delta\tau)$ and one of the m second RF modulated signal $S2'(t)$ to output a first in-phase coupled RF modulated optical signal and a second in-phase coupled RF modulated optical signal. The first output of the in-phase coupled RF modulated optical signal can be mathematically represented as $$\frac{S_1(t-m\Delta\tau) + iS_2(t)}{2}.$$

The second output of the in-phase coupled RF modulated optical signal can be mathematically represented as $$\frac{iS_1(t-m\Delta\tau) + S_2(t)}{2}.$$

The first output of the quadrature-phase coupled RF modulated optical signal can be mathematically represented as $$\frac{S_1(t-m\Delta\tau) - S_2(t)}{2}.$$

The second output of the quadrature phase coupled RF modulated optical signal can be mathematically represented as $$i\frac{S_1(t-m\Delta\tau) + S_2(t)}{2}.$$

The I/O photo receiver further comprises a balanced photodetector coupled to the optical balanced in-phase couplers, wherein the balanced photodetector is configured to receive the first in-phase coupled RF modulated optical signal and the second in-phase coupled RF modulated optical signal from the optical balanced in-phase coupler and output the in-phase (I) integrated correlated weight coefficient $\chi_{real}(m)$.

As previously discussed, the photodetectors act as integrators. The output of the first photodetector to receive the first in-phase coupled RF modulated optical signal can be mathematically represented as:

$$\frac{\int |S_1(t-m\Delta\tau)|^2 + |S_2(t)|^2 + iS_1^*(t-m\Delta\tau)S_2(t) - iS_1(t-m\Delta\tau)s_2^*(t)}{4},$$

where * represents a complex conjugate. The output of the second photodetector to receive the second in-phase coupled RF modulated optical signal can be mathematically represented as:

$$\frac{\int |S_1(t-m\Delta\tau)|^2 + |S_2(t)|^2 - iS_1^*(t-m\Delta\tau)S_2(t) + iS_1(t-m\Delta\tau)s_2^*(t)}{4}.$$

The I/O photo receiver further comprises a balanced photodetector coupled to the optical balanced quadrature-phase coupler, wherein the balanced photodetector is configured to receive the first quadrature phase coupled RF modulated optical signal and the second quadrature phase coupled RF modulated optical signal from the optical balanced quadrature-phase coupler and output the quadrature-phase (Q) integrated correlated weight coefficient $\chi_{imag}(m)$. The output of the first photodetector to receive the first quadrature-phase coupled RF modulated optical signal can be mathematically represented as:

$$\frac{\int |S_1(t-m\Delta\tau)|^2 + |S_2(t)|^2 - iS_1^*(t-m\Delta\tau)S_2(t) + iS_1(t-m\Delta\tau)s_2^*(t)}{4}.$$

The output of the second photodetector to receive the second quadrature-phase coupled RF modulated optical signal can be mathematically represented as:

$$\frac{\int |S_1(t-m\Delta\tau)|^2 + |S_2(t)|^2 + iS_1^*(t-m\Delta\tau)S_2(t) + S_1(t-m\Delta\tau)s_2^*(t)}{4}.$$

The differential of the two photodetector outputs for the optical balanced in-phase coupler can be mathematically represented as $$\int \frac{-S_1^*(t-m\Delta\tau)S_2(t) - S_1(t-m\Delta\tau)S_2^*(t)}{2} = -\text{Re}\ al\left(\int S_1^*(t-m\Delta\tau)S_2\right),$$

which is equal to $-\text{Real}(\chi(m\Delta\tau)$. Similarly, the differential of the two photodetectors outputs for the optical balanced quadrature-phase coupler can be mathematically represented as $$\int \frac{S_1^*(t-m\Delta\tau)S_2(t) - S_1(t-m\Delta\tau)S_2^*(t)}{2} = -\text{Im}\ ag\left(\int S_1^*(t-m\Delta\tau)S_2(t)\right),$$

which is equal to $-\text{Imag}(\chi m\Delta\tau)$.

The use of an I/O receiver 541 provides several advantages relative to merely using a single balanced coupler 122 to provide a magnitude of a frequency domain correlated signal, as discussed with respect to FIG. 1. The output of the I/O receiver 541 has both the real and the imaginary parts of the correlation weight coefficients, and so it truly allows calculating the frequency domain correlation by having all the real and imaginary contents. In addition, the analog to digital (A2D) converter in the processor 530 can be configured to sample at half of the speed relative to the A2D converter in the processor 130 that does not receive both in-phase and quadrature-phase components of the frequency domain correlated signal. This allows broader bandwidth signals to be sampled by the processor. Alternatively, a slower, less expensive processor 530 can be used for first RF signals with the same bandwidth relative to processor 130 to decrease the cost of the PIC RF correlator system 500.

Figure 6:
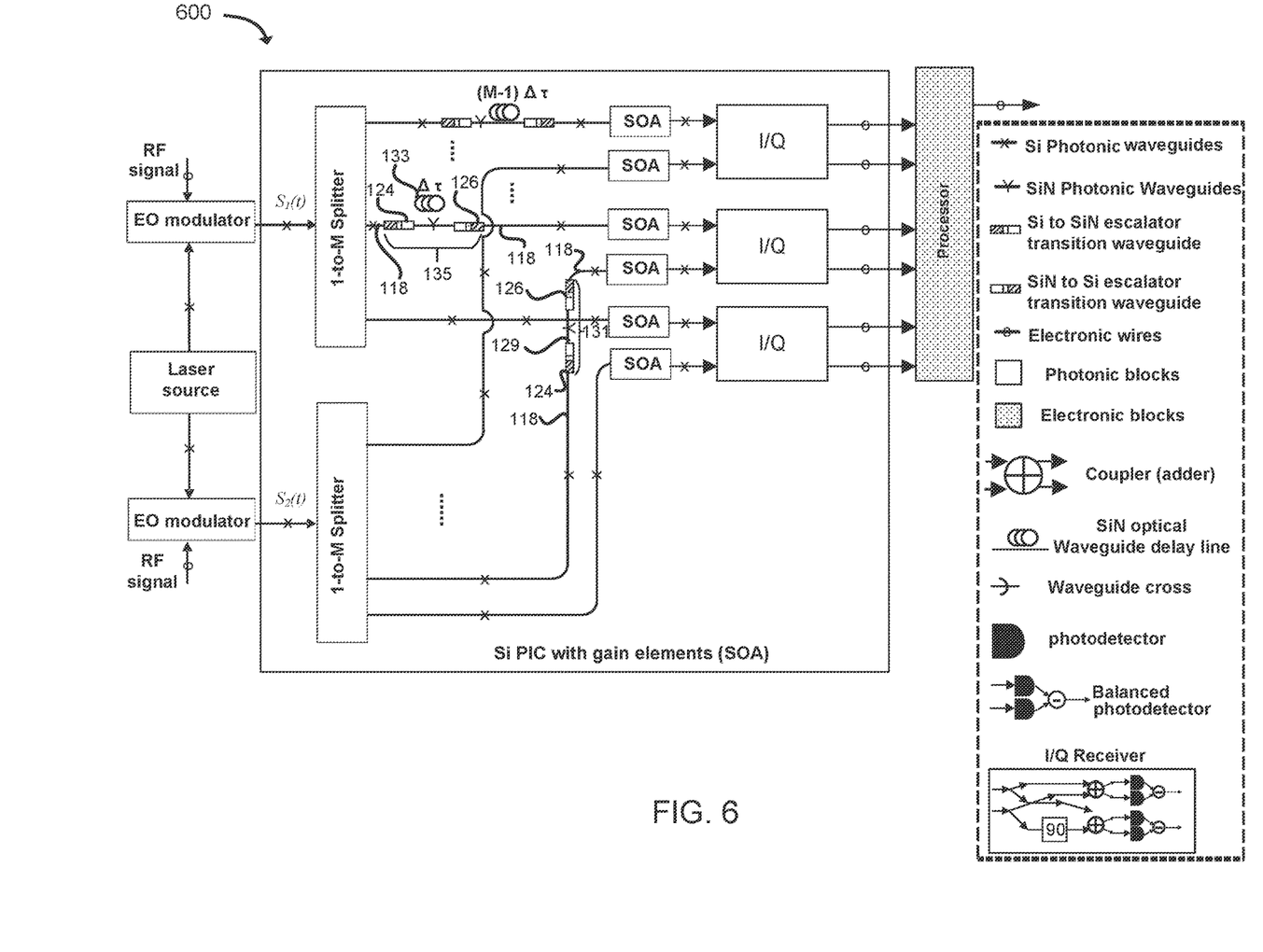
FIG. 6 illustrates the PIC of FIG. 5 with waveguide escalators in accordance with an example.

FIG. 6 also shows a waveguide delay line escalator element 135 that can be configured to form a delay line. The delay line waveguide escalator element 135 can be comprised of a waveguide comprising a first section of silicon waveguide 118 followed by a transition waveguide region of increasing doped silicon nitride 124, followed by a silicon nitride optical waveguide delay line 133, followed by a decreasingly doped transition waveguide region of decreasingly doped silicon nitride 126, followed by a silicon waveguide 118.

Figure 7:
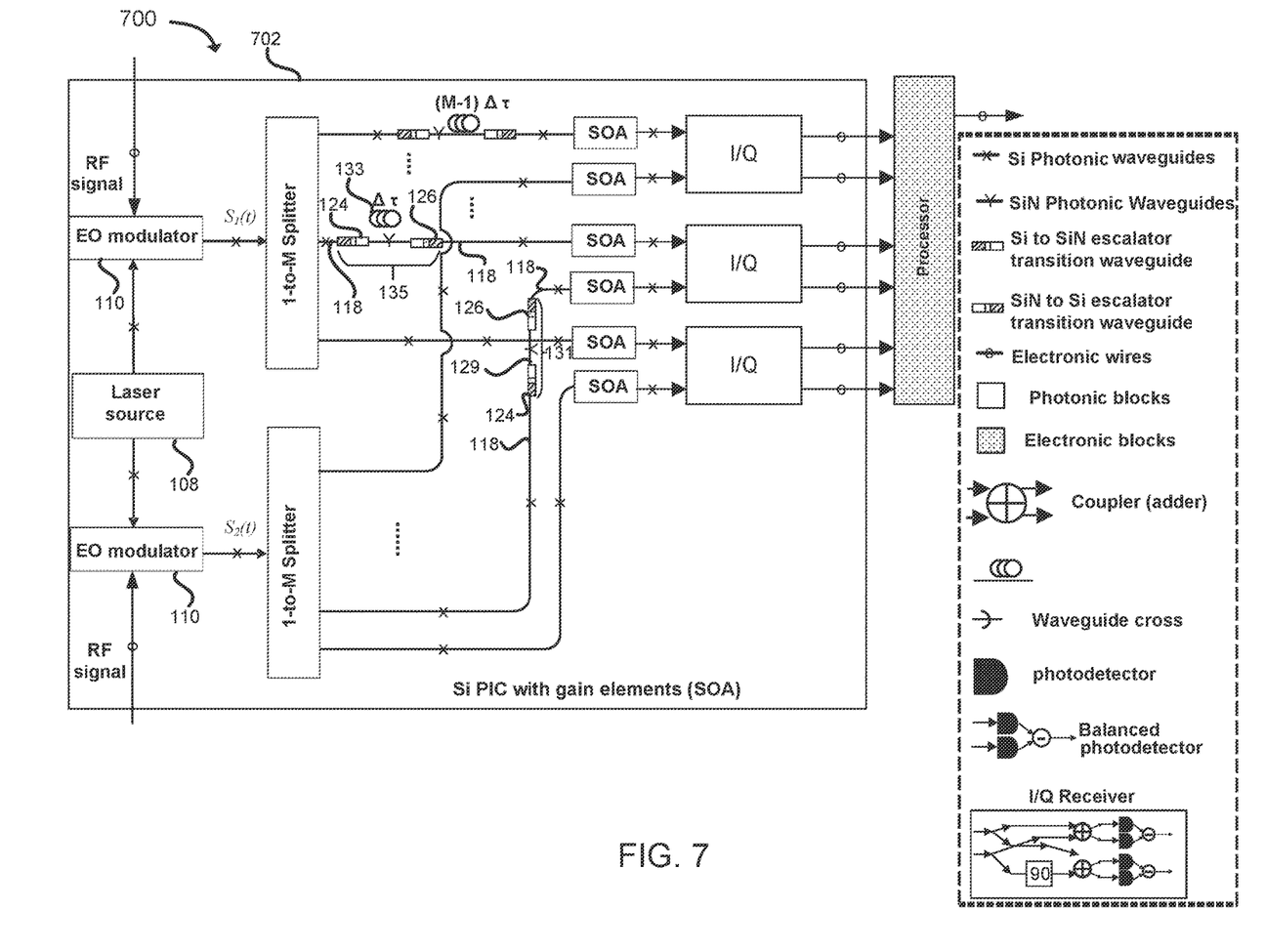
FIG. 7 illustrates the PIC of FIG. 6 with a compact integrated PIC system in accordance with an example.

FIG. 7 provides an illustration of an example of a compact integrated PIC system 700 that comprises a compact integrated PIC 702 that can includes the elements of FIG. 6 and a laser source 108 and EO modulators 110 that can be coupled to or implemented in the compact integrated PIC 702. The compact integrated PIC 702 may also be fabricated using a less expensive fabrication processes relative to PIC designed for high accuracy. The compact integrated PIC 702 can also be maintained in a temperature controlled environment. Even with a lower quality laser source 108, lower quality EO modulator 110, and photonic waveguides 118 with greater loss and greater differences in path length relative to the high accuracy PIC system 102, the processor 130 coupled to the compact integrated PIC 402 can still be configured to output a frequency domain correlated signal 140 that can be useful in systems including, but not limited to electronic warfare, direction finding systems, wideband signal communication, signal processing systems that use a wideband, low size, weight, and power correlator, and 5G communication systems.

Various techniques, or certain aspects or portions thereof, can take the form of program code (i.e., instructions) embodied in tangible media, such as floppy diskettes, compact disc-read-only memory (CD-ROMs), flash drives, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A photonic radio frequency (RF) signal correlator comprising:
   a photonic integrated circuit (PIC) comprising:
      a first optical waveguide configured to receive a laser light signal from a continuous wave (CW) laser source modulated with a first radio frequency signal to form a first RF modulated optical signal $S_1(t)$, wherein t is time;
      a first 1 to M optical splitter having an input coupled to the first optical waveguide and M outputs, the first 1 to M optical splitter configured to receive $S_1(t)$ at the input and divide the signal $S_1(t)$ to provide a signal $S1'(t)$ at the M outputs to form M first RF modulated optical signals $S1'(t)$, wherein each of the M first RF modulated optical signal signals $S1'(t)$ have substantially equal power, wherein M is a positive integer greater than 1;
      M discrete optical delay lines coupled to the M outputs of the first 1-to-M optical splitter, wherein the M discrete optical delay lines each provide a separate delay from $0 \times \Delta\tau$ to $(M-1) \Delta\tau$ respectively to provide M different delayed first RF modulated optical signals S1'(t), S1'(t−Δτ), ... S1'(t−(M−1) Δτ), where 1/Δτ is more than twice a bandwidth of the first RF signal;

a second optical waveguide configured to receive a laser light signal of the CW laser source modulated with a second radio frequency signal to form a second RF modulated optical signal S2(t);

a second 1-to-M optical splitter having an input coupled to the second optical waveguide and M outputs, the second 1 to M optical splitter configured to receive the modulated optical signal S2(t) at the input and divide the signal S2(t) to provide a signal S2'(t) at the M outputs to form M second RF modulated optical signals, wherein each of the M second RF modulated optical signal signals S2'(t) have substantially equal power;

M optical balanced couplers of index m having a first input, second input, first output and second output, where m=0 to M−1, the Mth optical balanced coupler configured to receive and combine the $m^{th}$ different delayed first RF modulated optical signal S1'(t−mΔτ) and one of the m second RF modulated signal S2'(t) to output m first coupled RF modulated optical signals and m second coupled RF modulated optical signals; and M balanced photodetectors coupled to the M optical balanced couplers, wherein the Mth balanced photodetector is configured to receive the $m^{th}$ first coupled RF modulated optical signal and the $m^{th}$ second coupled RF modulated optical signal from the Mth optical balanced coupler and output M signals proportional to a correlation integrated weight coefficient; and a processor electrically coupled to the output of the M balanced photodetectors, the processor configured to receive and sum the M electrical signals proportional to the correlation integrated weight coefficient according to the summation $$\sum_{m=0}^{M-1} \chi(m\Delta\tau)\exp(i2\pi m\Delta\tau f),$$

to output a frequency domain correlated signal of the first RF signal and the second RF signal, where i is an imaginary number, f is a frequency of the frequency domain correlated signal, and $$\chi(m\Delta\tau) = \int_{-\infty}^{\infty} S_1^*(t - m\Delta\tau) \cdot S_2(t) dt, \text{ and } s_1^*$$

is the complex conjugate of $S_1$.

2. The photonic RF signal correlator of claim 1, wherein the CW laser source is one or more of:
a laser that is heterogeneously integrated on the PIC;
a laser that is implemented within the PIC; or
a laser that is located external to the PIC and optically coupled to the PIC via one or more of an optical fiber, a waveguide, or free-space coupling.

3. The photonic RF signal correlator of claim 2, further comprising:
a first electro-optical modulator configured to modulate the first RF signal with the CW laser source to output the first RF modulated optical signal S1(t) to the first optical waveguide; and a second electro-optical modulator configured to modulate the second RF signal with the CW laser source to output the second RF modulated optical signal S2(t) to the second optical waveguide.

4. The photonic RF signal correlator of claim 3, wherein the first electro-optical modulator and the second electro-optical modulator are one or more of:
heterogeneously integrated on the PIC;
implemented within the PIC; or
located external to the PIC and optically coupled to the PIC via one or more of an optical fiber, a waveguide, or free-space coupling.

5. The photonic RF signal correlator of claim 1, wherein the first optical waveguide and the second optical waveguide are on-chip optical waveguides.

6. The photonic RF signal correlator of claim 1, wherein the M discrete optical delay lines coupled to the M outputs of the first 1-to-M optical splitter are on-chip waveguides.

7. The photonic RF signal correlator of claim 1, wherein the M discrete optical delay lines coupled to the M outputs of the first 1-to-M optical splitter are comprised of a homogenous material optical waveguide selected from one or more of silicon, indium phosphide, or gallium arsenide.

8. The photonic RF signal correlator of claim 1, wherein the M discrete optical delay lines coupled to the M outputs of the first 1-to-M optical splitter are comprised of a first waveguide section formed of a first single-chemistry material, coupled to a second waveguide section with a transition waveguide region that is increasingly doped with a second single-chemistry material, coupled to a third waveguide section that is formed of the second single-chemistry material, coupled to a fourth waveguide section with a decreasingly doped transition waveguide region of decreasingly doped second single-chemistry material, coupled to a fifth waveguide section that is formed of the first single-chemistry material.

9. The photonic RF signal correlator of claim 1, further comprising semiconductor optical amplifiers (SOA) heterogeneously integrated with or directly implemented within the PIC, with an SOA is coupled to each of the M outputs of the first 1-to-M optical splitter and the M outputs of the second 1-to-M optical splitter to provide a selected optical gain to the M S1'(t) signals and the M S2'(t) signals.

10. The photonic RF signal correlator of claim 1, wherein the 1-to-M optical splitter is comprised of one or more of:
a cascade of multimode interference splitters; or
a binary-tree cascade of 1-to-2 splitters or 1-to-N splitters, where N is an integer that is less than M.

11. The photonic RF signal correlator of claim 1, further comprising photonic waveguides integrated on the PIC, wherein the PIC further comprises:
2M photonic waveguides used to couple the M outputs of the first 1 to M optical splitter and the M outputs of the second 1 to M optical splitter to a semiconductor optical amplifier (SOA);
a photonic waveguide used to couple an output of each SOA to the M optical balanced couplers;
a photonic waveguide used to couple the first output of each of the M optical balanced couplers to an input of a first photodetector of the M balanced photodetectors, respectively; and
a photonic waveguide used to couple the second output of each of the M optical balanced couplers to an input of a second photodetector of the M balanced photodetectors, respectively.

12. The photonic RF signal correlator of claim 1, further comprising waveguide crossing elements to enable photonic waveguides from the M outputs of the second 1 to M optical splitter to cross selected photonic waveguides coupled to the M outputs of the first 1 to M optical splitter.

13. The photonic RF signal correlator of claim 1, further comprising waveguide escalator elements configured to enable:
   photonic waveguides from the M outputs of the second 1 to M optical splitter to cross selected photonic waveguides coupled to the M outputs of the first 1 to M optical splitter; or
   photonic waveguides from the M outputs of the first 1 to M optical splitter to cross selected photonic waveguides coupled to the M outputs of the second 1 to M optical splitter.

14. The photonic RF signal correlator of claim 13, wherein the waveguide escalator elements are comprised of:
   a first waveguide section formed of a first single-chemistry material, coupled to a second waveguide section with a transition waveguide region that is increasingly doped with a second single-chemistry material, coupled to a third waveguide section that is formed of the second single-chemistry material, coupled to a fourth waveguide section with a decreasingly doped transition waveguide region of decreasingly doped second single-chemistry material, coupled to a fifth waveguide section that is formed of the first single-chemistry material.

15. The photonic RF signal correlator of claim 1, wherein the M discrete optical delay lines are comprised of optical delay lines configured to provide substantially uniform time delays in the M $S'1(t)$ signals, with the uniform time delays from $0 \times \Delta\tau$ to $(M-1) \Delta\tau$.

16. The photonic RF signal correlator of claim 1, wherein the M discrete optical delay lines are comprised to provide non-uniform delays in the M $S'1(t)$ signals.

17. The photonic RF signal correlator of claim 1, wherein:
   the mth first coupled RF modulated optical signal comprises an optical output $C_{1m}(t)$ that is equal to $[S_1'(t-m\Delta\tau)+jS_2'(t)]/2^{0.5}$, where j is an imaginary number; and
   the mth second coupled RF modulated optical signal comprises an optical output $C_{2m}(t)$ that is equal to $[jS_1'(t-m\Delta\tau)+S_2'(t)]/2^{0.5}$.

18. The photonic RF signal correlator of claim 1, wherein the M signals proportional to a correlation integrated weight coefficient output by the M balanced photodetectors are electrical signals output from the PIC to the processor.

19. A photonic radio frequency (RF) signal correlator comprising:
   a photonic integrated circuit (PIC) comprising:
      a first optical waveguide configured to receive a laser light signal from a continuous wave (CW) laser source modulated with a first radio frequency signal to form a first RF modulated optical signal $S_1(t)$, wherein t is time;
      a first 1 to M optical splitter having an input coupled to the first optical waveguide and M outputs, the first 1 to M optical splitter configured to receive $S_1(t)$ at the input and divide the signal $S_1(t)$ to provide a signal $S1'(t)$ at the M outputs to form M first RF modulated optical signals $S1'(t)$, wherein each of the M first RF modulated optical signal signals $S_1'(t)$ have substantially equal power, wherein M is a positive integer greater than 1;
      M discrete optical delay lines coupled to the M outputs of the first 1-to-M optical splitter, wherein the M discrete optical delay lines each provide a separate delay from $0 \times \Delta\tau$ to $(M-1) \Delta\tau$ respectively to provide M different delayed first RF modulated optical signals $S1'(t)$, $S_1'(t-\Delta\tau)$, . . . $S_1'(t-(M-1) \Delta\tau)$, where $1/\Delta\tau$ is more than twice a bandwidth of the first RF signal;
      a second optical waveguide configured to receive a laser light signal of the CW laser source modulated with a second radio frequency signal to form a second RF modulated optical signal $S_2(t)$;
      a second 1-to-M optical splitter having an input coupled to the second optical waveguide and M outputs, the second 1 to M optical splitter configured to receive the modulated optical signal $S_2(t)$ at the input and divide the signal $S_2(t)$ to provide a signal $S2'(t)$ at the M outputs to form M second RF modulated optical signals, wherein each of the M second RF modulated optical signal signals $S2'(t)$ have substantially equal power;
      M optical balanced couplers of index m having a first input, second input, first output and second output, where m=0 to M−1, the Mth optical balanced coupler configured to receive and combine the $m^{th}$ different delayed first RF modulated optical signal $S_1'(t-m\Delta\tau)$ and one of the m second RF modulated signal $S2'(t)$ to output m first coupled RF modulated optical signals and m second coupled RF modulated optical signals; and
      M balanced photodetectors coupled to the M optical balanced couplers, wherein the Mth balanced photodetector is configured to receive the $m^{th}$ first coupled RF modulated optical signal and the $m^{th}$ second coupled RF modulated optical signal from the Mth optical balanced coupler and output M signals proportional to a correlation integrated weight coefficient; and
   a processor electrically coupled to the output of the M balanced photodetectors, the processor configured to receive and sum the M electrical signals to output a frequency domain correlated signal of the first RF signal and the second RF signal.

20. The photonic RF signal correlator of claim 19, wherein:
   the mth first coupled RF modulated optical signal comprises an optical output $C_{1m}(t)$ that is equal to $[S_1'(t-m\Delta\tau)+jS_2'(t)]/2^{0.5}$, where j is an imaginary number; and
   the mth second coupled RF modulated optical signal comprises an optical output $C_{2m}(t)$ that is equal to $[jS_1'(t-m\Delta\tau)+S_2'(t)]/2^{0.5}$.

* * * * *